United States Patent [19]

Korf

[11] Patent Number: 4,869,327
[45] Date of Patent: Sep. 26, 1989

[54] REVERSIBLE ONE-WAY DISK PLOW

[76] Inventor: Alfred W. Korf, 401 South Ivy Street, Yuma, Colo. 80759

[21] Appl. No.: 216,393

[22] Filed: Jul. 7, 1988

[51] Int. Cl.⁴ ............................................. A01B 5/08
[52] U.S. Cl. ................................... 172/211; 172/219; 172/310; 172/577
[58] Field of Search ............... 172/317, 318, 320, 204, 172/219, 211, 212, 209, 310, 577, 584, 599, 600, 120, 413, 220, 213, 55, 240

[56] References Cited

U.S. PATENT DOCUMENTS

| | | | |
|---|---|---|---|
| 617,378 | 1/1899 | Wilbur | 172/219 |
| 659,748 | 10/1900 | Hill | 172/219 |
| 678,489 | 8/1901 | Wiebe | 172/648 |
| 850,520 | 4/1907 | Butterfield | 172/577 |
| 918,128 | 4/1909 | Cook | 172/120 X |
| 1,131,238 | 3/1915 | Heylman | 172/577 |
| 1,180,477 | 9/1912 | Cook et al. | 172/55 |
| 1,710,132 | 4/1929 | Williams | 172/600 |
| 1,769,162 | 8/1930 | Peterson | 172/577 |
| 2,491,556 | 4/1946 | Fulkerson | 172/207 |
| 2,596,579 | 5/1952 | McKay | 172/440 |
| 2,824,505 | 2/1958 | Coviello | 172/212 |
| 2,857,724 | 10/1958 | Kenney | 172/599 X |
| 3,039,538 | 6/1962 | Coviello | 172/212 |

FOREIGN PATENT DOCUMENTS

| | | | |
|---|---|---|---|
| 503002 | 5/1951 | France | |
| 1342609 | 12/1963 | France | 172/220 |

Primary Examiner—Richard J. Johnson
Assistant Examiner—Jeffrey L. Thompson
Attorney, Agent, or Firm—Dean P. Edmundson

[57] ABSTRACT

A reversible one-way disk plow is described which includes a frame with transport wheels and an arcuate track secured to the frame. An elongated disk plow is pivotably supported under the frame, and a plurality of gauge wheels are carried by the frame. The plow can be selectively pivoted between first and second positions relative to the longtiudinal centerline of the frame. Hydraulic cylinders are used to pivot the disk plow, raise and lower the transport wheels, and raise and lower the gauge wheels.

17 Claims, 4 Drawing Sheets

REVERSIBLE ONE-WAY DISK PLOW

FIELD OF THE INVENTION

This invention relates to agricultural tilling implements. More particularly, this invention relates to disk plows. Even more particularly, this invention relates to reversible one-way disk plows.

BACKGROUND OF THE INVENTION

Conventional plows which have been used to plow farm ground have been moldboard or disk plows. Typically both of these types of plows leave dead furrows in the field. These are small ditches that are left by the plow. Dead furrows lead to erosion and uneven distribution of soil.

Although dead furrows can be avoided by using a rollover moldboard plow, those implements are relatively expensive and require a relatively large horsepower tractor to pull them. Such plows also pack or compress the soil under the plow leaving a hardpan which prevents the trickle effect of moisture going to the roots of plants and prevents roots from easily penetrating the soil.

An offset disk could also be used to till the ground, but the second gang of the disk moves the soil loosened by the first gang back to its original position. The offset disk also packs the soil under the disk, and it does not leave residue on the surface to catch moisture or prevent wind erosion of the soil.

When plowing soil containing certain types of weeds or grasses it is necessary to plow several inches deep and completely cover the weeds or grass. A disk plow works well for this purpose also.

Various types of disks, plows, and harrows are described in the following U.S. Pat. Nos.: 617,378; 850,520; 1,131,238; 1,769,162; and 2,596,579. Various types of reversible disks, plow, or cultivators are described in U.S. Pat. Nos. 2,491,556; 678,489; 659,748; and Belgian Pat. No. 503002. However, none of these patents describes or suggests a reversible one-way disk plow having the features and advantages of the present invention.

SUMMARY OF THE INVENTION

In accordance with the present invention there is provided a reversible one-way disk plow which can be used for plowing ground. When one pass across a field is completed the plow may be turned around and towed across the field in the opposite direction to plow the ground adjacent to the ground plowed in the first pass. The disk plow is pivoted with respect to the frame so that the soil is thrown in the same direction with each pass across the field, leaving only one open furrow in the field.

In one embodiment the reversible one-way disk plow comprises:

(a) an elongated frame member having front and rear end sections, the frame member including a hitch attached to the front end portion for towing the implement;

(b) transport wheels carried by the frame, the wheels being movable between raised and lowered positions, wherein the wheels are adapted to support the implement for transport when the wheels are in said lowered position;

(c) disk plow means comprising a plurality of disks carried on an elongated shaft;

(d) an elongated plow carrier; wherein the disk plow means is carried by the plow carrier; wherein the plow carrier is pivotable in a horizontal plane with respect to the frame member;

(e) an arcuate track member secured to the frame member;

(f) carriage means secured to the plow carrier and being carried by the track member; wherein the carriage means is movable along the track member;

(g) a plurality of gauge wheels carried by the frame member, the gauge wheels being adapted to control the depth of the disk plow means in the ground when the transport wheels are in raised position; and (h) control means for controlling movement of the transport wheels between raised and lowered positions and for moving the carriage means along the track member to change the angle of the disk plow means relative to the longitudinal centerline of the frame member.

A disk plow implement of this invention enables plowing of an entire field, regardless of size, while leaving only one open furrow at one side of the field. The disk plow is easily pivoted with respect to the frame so as to reverse the direction to which the plowed soil is thrown as the implement is used.

The reversible plow of this invention requires less horsepower to tow through the ground than is required with respect to a conventional moldboard plow. As a result, a smaller and more economical tractor may be used than would normally be required.

Also, the reversible plow is less expensive than a conventional offset disk and provides superior results. Another advantage is that the angle of the disk plow may be infinitely varied, as desired. The types of disks used may also be varied.

Other advantages of the reversible one-way disk plow of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
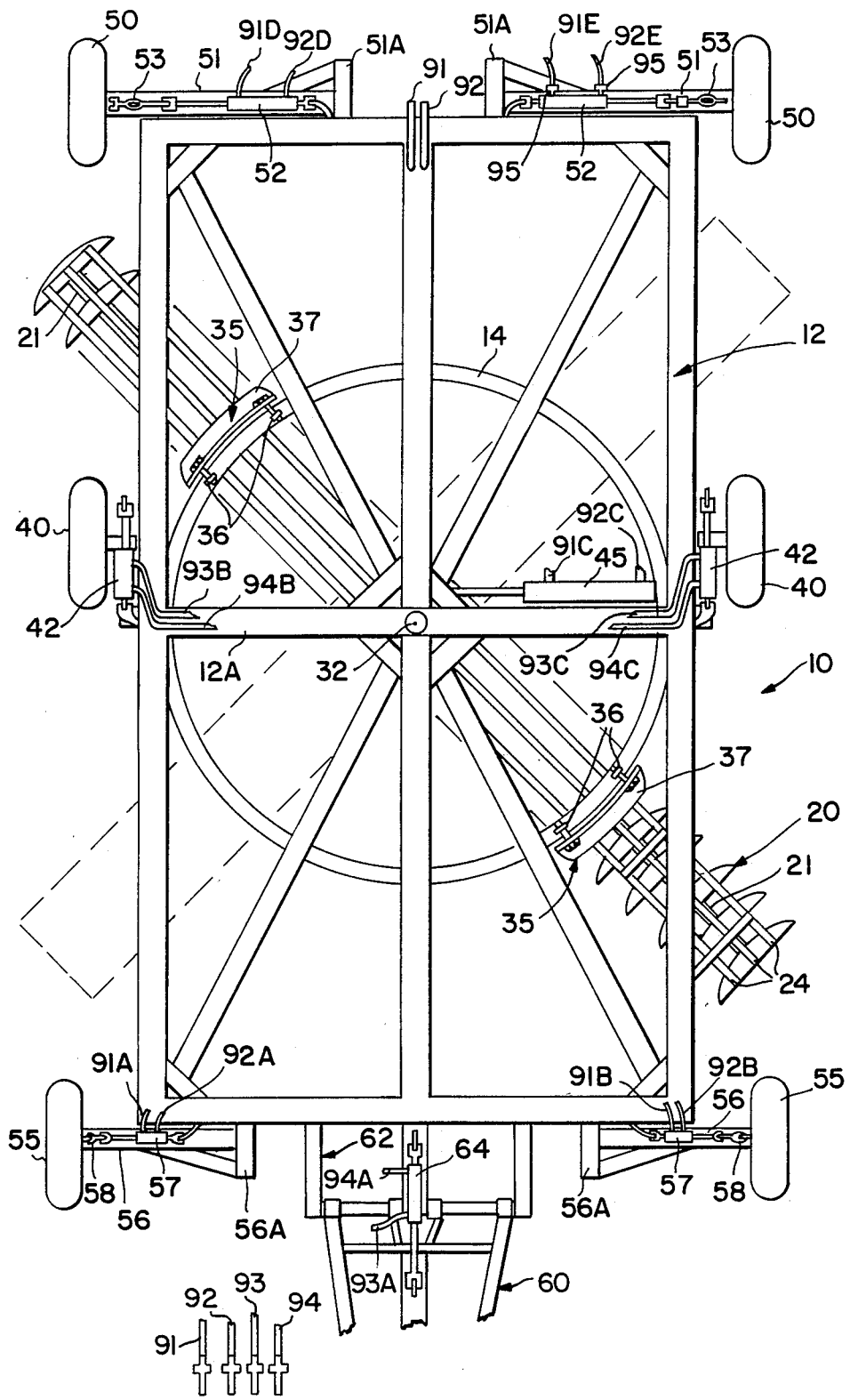
FIG. 1 is a top view of a preferred embodiment of the reversible one-way disk plow of the invention.
Figure 2:
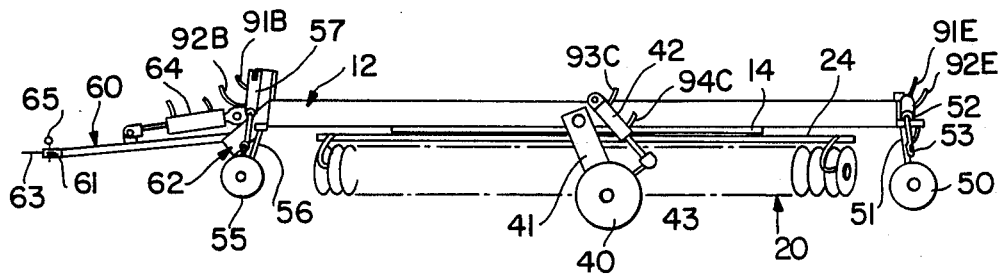
FIG. 2 is a side elevational view of the disk plow shown in FIG. 1.

In the drawings there is illustrated a preferred embodiment of reversible one-way disk plow 10 of the invention. The implement includes an elongated (preferably rectangular) frame member 12 which is disposed in a generally horizontal plane. An arcuate track 14 is secured to the underside of the frame and centrally located with respect to the frame.

Figure 4:
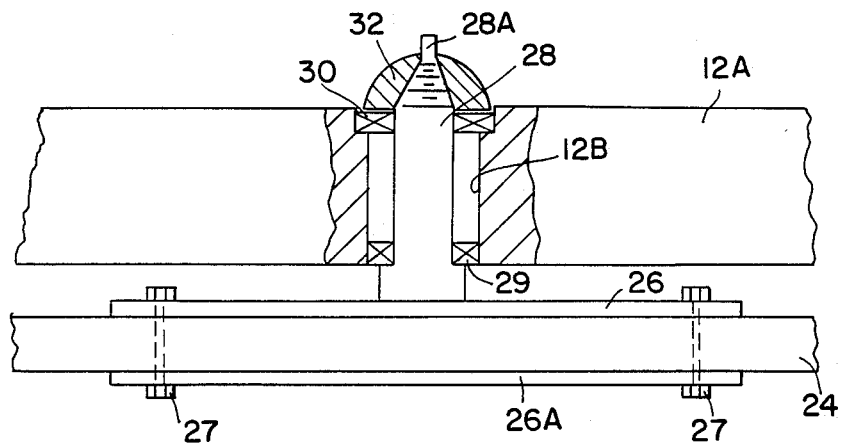
FIG. 4 is a side elevational, partially cut-away, view illustrating a preferred manner in which the disk plow is pivotable with respect to the frame of the implement.

An elongated disk plow 20 is connected to an elongated plow carrier comprising three parallel tubular members 24 which extend the length of disk plow 20, as illustrated. The disk plow is in a horizontal plane beneath the frame 12 and is pivotable with respect to the frame 12. The plow 20 comprises a plurality of spaced disks 20A carried on an elongated shaft 21. The plow carrier 24 is secured at its mid-point to plate 26 by means of bolts 27 and under plate 26A. See FIG. 4.

Plate 26 is secured to the lower end of vertical shaft or axle 28 (e.g., by welding). Shaft 28 extends through the central beam 12A and is able to rotate relative to beam 12A. Lower bearing 29 and upper bearing 30 are positioned around shaft 28 within opening 12B in frame 12A.

Threaded cap 32 is threaded onto the upper end of shaft 28 which is also threaded. Cap 32 includes an opening at the top through which the upper end 28A of shaft 28 projects. The cap 32 retains the shaft 28 in its proper position.

Attached to opposite side edges of the frame 12 are transport wheels 40 which are movable between a raised position and a lowered position. When the wheels are in the lowered position the frame 12 (and consequently the disk plow 20) is raised upwardly. When the wheels are in the raised position, the frame is lowered in a manner such that the disk plow engages the ground for plowing purposes.

Figure 3:
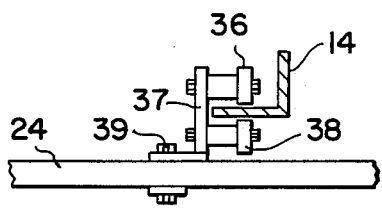
FIG. 3 is is an elevational view illustrating a preferred manner in which the disk plow is supported on a track member.

Each wheel 40 is carried at the end of a pivotable leg 41 connected to the side of the frame. Hydraulic cylinder 42 is connected at one end to frame 12 and at the other end to an arm 43 projecting rearwardly from leg 41. When the cylinder 42 is retracted the wheel 40 is raised, and when the cylinder is extended the wheel is lowered Below the frame 12 is secured the arcuate track member 14. Carriage members 35 are secured to carrier 24 on opposite sides of the arcuate track 14, as illustrated in FIG. 1. Each carriage member 35 includes upper rollers 36 rotatably connected by bolts to body 37. The carriage member also includes lower rollers 38 which are also rotatably connected by bolts to body 37. See FIG. 3. Body 37 is connected (eg., by means of bolts 39) to plow carrier 24.

The disk plow 20 can be pivoted with respect to frame 12 (e.g., by means of hydraulic cylinder 45) to any desired position in a horizontal plane. One end of cylinder 45 is secured to frame 12 and the other end is secured to plate 26 and carrier 24. This enables the disk plow to be oriented in one position while the plow is towed across a field in one direction, and then the disk plow can be oriented in another position for towing the plow across the field in the opposite direction. This is illustrated in FIG. 1 where the disk plow is shown in one position, and dotted lines illustrate a second position for the plow relative to the frame 12 and the track 14. For transport down the road the disk plow 20 can be oriented in a longitudinal direction with respect to the length of the frame 12.

Although the arcuate track 14 is shown as a single circular track, it is possible to have two arcuate track members instead. In such event, one carriage member 35 is carried by one such track section and the other carriage member is carried by the other track section. If two track sections are used, they are disposed on opposite sides of the pivot shaft 28. In this manner the carriage members stably support the entire length of the disk plow and prevent it from tilting upwardly at either end.

There are two gauge wheels 50 at the rear end of the frame 12 and two gauge wheels 55 at the front end of the frame. As illustrated there is one gauge wheel at each corner of the frame. Each gauge wheel 50 is rotatably carried at the outer end of leg 51. The inner end 51A is pivotably attached to the frame. Hydraulic cylinder 52 is adapted to raise and lower each gauge wheel 50 by movement of leg 51. Turnbuckle 53 allows close adjustment of the height to which the gauge wheel is set when the plow is in the ground.

Each gauge wheel 55 is rotatably carried at the outer end of a leg 56. The inner end 56A is pivotably attached to the frame. Hydraulic cylinder 57 is adapted to raise and lower each gauge wheel 55 by movement of leg 56. Turnbuckle 58 allows close adjustment of the height to which the gauge wheel is set when the plow is in the ground.

All of the gauge wheels are raised when the frame is raised to its upper position (i.e., when the disk plow is out of the ground). When the disk plow is in the ground, one of the front gauge wheels is positioned in the furrow left by the plow on the previous pass through the field. The other front gauge wheel rides on top of the ground ahead of the plow. One of the rear gauge wheels rides in the new furrow left by the plow, and the other rear gauge wheel is in a raised position since it is not needed. Thus, three of the gauge wheels are riding on the ground whenever the plow is in a working position. The gauge wheels accurately maintain the plow at the desired depth for plowing the soil.

When the plow reaches the end of the field it can be raised out of the ground and turned around 180° to a direction opposite to the previous pass. Then the disk plow is pivoted with respect to the frame so that it is set to throw soil toward the soil plowed on the previous pass. The rear gauge wheel which was previously in a raised position is lowered, and the rear gauge wheel which was in the furrow on the previous pass is raised to its upward position.

In this manner the implement enables the plowed soil to be thrown in the same direction on each pass through the field. This leaves only one open furrow at the edge of the field when the plowing is complete. The next year (or whenever the field is plowed again) the direction of plowing can be reversed so that the soil is thrown in the opposite direction.

The implement includes a hitch 60 attached to bracket 62 at the front end of the frame 12. The hitch 60 is preferably pivotably attached to the bracket. A hydraulic cylinder 64 is connected at one end to bracket 62 and is connected at the other end to hitch 60. The leading end 61 of the hitch is adapted to be connected to the drawbar 63 of a tractor by means of a pin 65.

The hydraulic cylinder 64 is very useful in controlling the attitude or tilt of frame 12. In other words, the cylinder 64 can raise or lower the front of frame 12 in a manner such that it can be maintained level so as to maintain the disk plow 20 level with respect to the ground being plowed.

The movement of the transport wheels and gauge wheels, and the orientation of the disk plow and hitch leveller, are all controlled remotely from the tractor towing the implement. This is done by the action of the various hydraulic cylinders on the implement.

In a preferred operating mode there are four hydraulic lines 91, 92, 93 and 94 which are operably connected to hydraulic systems of the tractor. Lines 91 and 92 are operably connected at 91A and 92A to cylinder 57 for control of one of the front gauge wheels. Lines 91 and 92 are also operably connected at 91B and 92B to cylinder 57 for control of the other front gauge wheel. The connections to both cylinders 57 are such that when one front gauge wheel is raised to ride on top of the unplowed ground the other gauge wheel is lowered to ride in the furrow.

Lines 91 and 92 are also operably connected to the cylinder 45 (at 91C and 92C) for operation of cylinder 45 in pivoting disk plow 20 when desired. Lines 91 and 92 are further operably connected to the cylinders 52 (at 91D, 92D, 91E and 92E) for operation of those cylinders in raising and lowering the rear gauge wheels. On one of the cylinders 52 there are used quick couplers 95 which allow lines 91E and 92E to be uncoupled and switched around so that both rear gauge wheels can be raised simultaneously (e.g., for transport purposes). Quick couplers can also be used on one of the cylinders 57 at the front of the implement for the same purpose.

Lines 93 and 94 are operably connected to cylinders 42 (at 93B, 94B, 93C and 94C) to raise and lower the transport wheels 40 simultaneously. Lines 93 and 94 are also operably connected to cylinder 64 (at 93A and 94A) to control the attitude of the frame 12 of the implement).

By means of the hydraulic system described herein, one control lever is adapted to cause the gauge wheels to move to the desired position while the disk plow is simultaneously being pivoted to its desired position for the next pass across the field. Another control lever is adapted to raise and lower the disk plow and level the implement.

Figure 5:
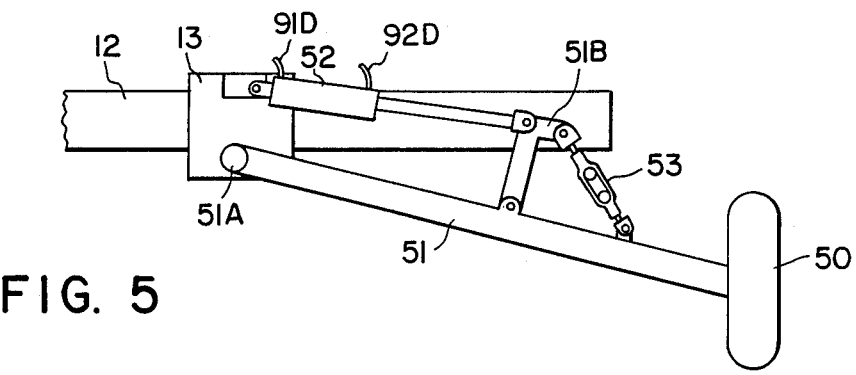
FIG. 5 is a rear elevational view illustrating one manner in which a rear gauge wheel is attached to the frame.

FIG. 5 is a rear elevational view illustrating one manner in which the rear gauge wheel 50 is attached to the frame 12 by means of leg 51. Bracket 13 is secured to the frame 12. End 51A of leg 51 is pivotably attached to the bracket. One end of cylinder 52 is detachably connected to the bracket 13 and the other end of the cylinder is connected to the upper end of post or arm 51B carried by leg 51. Turnbuckle 53 is connected at one end to arm 51B and is connected at the other end to an anchor on leg 51 toward wheel 50. This allows close adjustment of the extent to which the wheel 50 may be raised and lowered.

Figure 6:
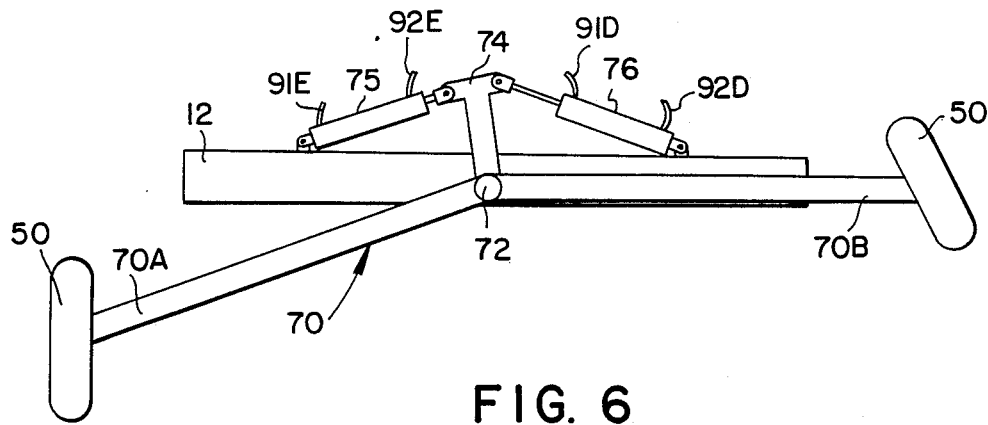
FIG. 6 is a rear elevational view illustrating another embodiment of rear gauge wheels which may be used in the implement of this invention.

FIG. 6 is a rear elevational view illustrating an alternative embodiment for rear gauge wheels 50. In this embodiment one gauge wheel is rotatably mounted at end 70A of integral leg system 70 and one gauge wheel is rotatably mounted at end 70B, as illustrated. The center or mid-point 72 of the leg system is pivotably attached to the mid-point of the rear cross-beam of frame 12.

Post or arm 74 is secured to leg system 70 and extends upwardly, as illustrated. A hydraulic cylinder 75 is connected between a mounting point on the frame 12 and the arm 74, and another hydraulic cylinder 76 is connected between a mounting point on the frame and the other side of arm 74. By retracting cylinder 76 at the same time that cylinder 75 is extended, end 70B is lowered while end 70A is raised. In this manner one rear gauge wheel is raised while the other is lowered.

Figure 7:
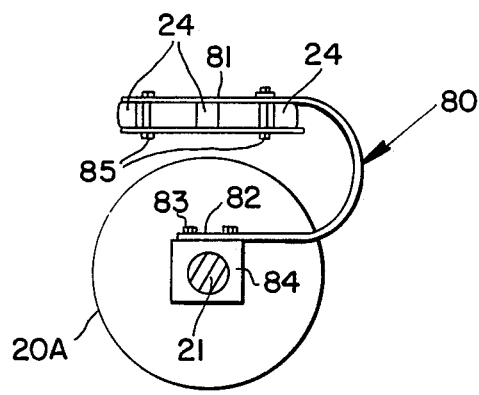
FIG. 7 is an elevational view illustrating one manner in which the disk plow may be supported from a carrier in the implement of the invention.

FIG. 7 is an elevational view illustrating a preferred manner in which the disk plow is attached or secured to the carrier 24. A mounting strap 80 is secured at one end 81 to carrier 24 (by means of bolts 85) and is secured at its opposite end 82 to a bearing block 84 by means of bolts 83. Shaft 21 on which the disks 20A are mounted passes through the bearing block 84. The mounting strap 80 may be secured to the underside of carrier 24, if desired, in order to provide more clearance between the top of the disk plow and the underside of the carrier.

A plurality of mounting straps 80 are used to connect the disk plow to the carrier. The mounting straps are preferably U-shaped as shown. Alternating straps are oriented in a manner such that one projects outwardly to the right (as shown in FIG. 7) and the next one projects outwardly to the left. In this manner the disk plow is held securely regardless of which direction it is working the ground.

Figure 8:
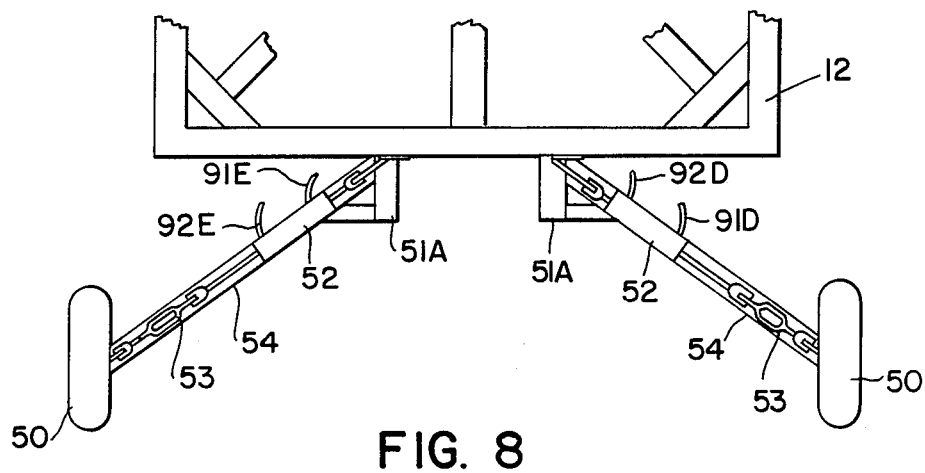
FIG. 8 is a top view of the rear portion of another embodiment of one-way disk plow of the invention illustrating another type of rear gauge wheel arrangement.

FIG. 8 is a top view of the rear portion of another embodiment of the invention to illustrate another manner in which the rear gauge wheels 50 may be mounted. In this embodiment each wheel is carried at the outer end of an elongated leg member 54 which projects rearwardly as well as outwardly. For example, each gauge wheel 50 may be disposed or located about 3 feet behind the rear of the frame 12. This arrangement helps to prevent side drift of the implement as it is used.

Figure 9:
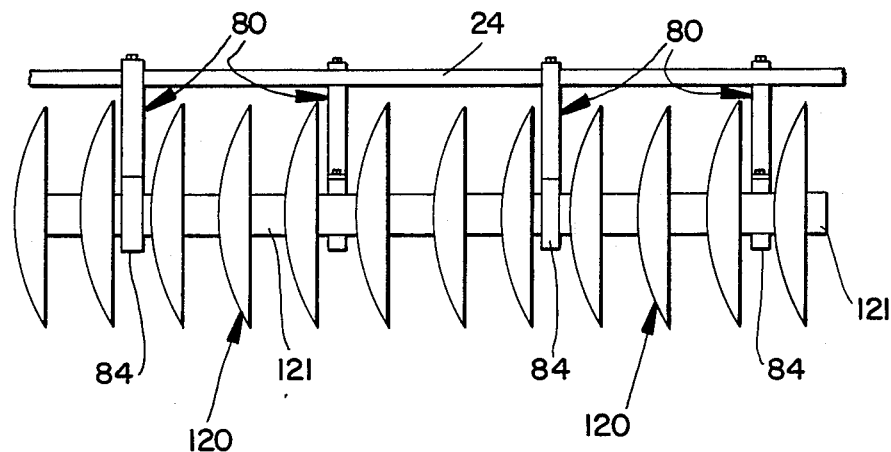
FIG. 9 is a side elevational view illustrating another embodiment of the invention.

Other variants are possible without departing from the scope of the present invention. For example, instead of a single continuous length of the disk plow (i.e., one shaft 21), there may be used a plurality of disk plow sections 120 aligned along a single axis. As illustrated in FIG. 9, each section 120 includes its own axle or shaft 121 on which the spaced disks are carried. Mounting straps 80 attach between the carrier 24 and the bearing blocks 84 to each section through which a shaft 121 passes, as illustrated. This allows for more expeditious repairs to be made in the event that a disk becomes broken or requires replacement.

The size of the disks may vary, e.g., from a diameter of about 24 inches to 36 inches. Also, the length of the disk plow may vary, e.g., from about 4 feet to 20 feet as a practical matter. Although there is no absolute limit to the length of the disk plow, it should not be so large that it cannot be transported on a highway.

What is claimed is:

1. A reversible one-way disk plow comprising:
   (a) an elongated frame member having front and rear end sections, said frame member including a hitch attached to said front end portion for towing said implement;
   (b) transport wheels carried by said frame, said wheels being movable between raised and lowered positions, wherein said wheels are adapted to support said implement for transport when said wheels are in said lowered position;
   (c) plow means comprising a plurality of disks carried on an elongated shaft;

(d) an elongated carrier; wherein said disk plow means is carried by said plow carrier; wherein said plow carrier is pivotable in a horizontal plane with respect to said frame member;

(e) an arcuate track member secured to said frame member;

(f) carriage means secured to said plow carrier and being carried by said track member; wherein said carriage means is movable along said track member;

(g) a plurality of gauge wheels carried by said frame member, said gauge wheels being adapted to control the depth of said disk plow means in the ground when said transport wheels are in said raised position;

(h) control means for controlling movement of said transport wheels between said raised and lowered positions and for moving said carriage means along said track member to change the angle of said disk plow means relative to the longitudinal centerline of said frame member; wherein said control means comprises a first and second control means, wherein said first control means comprises a hydraulic cylinder which is adapted to raise and lower said transport wheels; and wherein said second control means comprises a plurality of hydraulic cylinders which are adapted to raise and lower said gauge wheels and move said carriage means along said track member.

2. A reversible one-way disk plow in accordance with claim 1, wherein said plow carrier includes a vertical shaft at its mid-point, wherein said vertical shaft is rotatably connected to said frame member.

3. A reversible one-way disk plow in accordance with claim 1, wherein there are four of said gauge wheels, wherein two of said gauge wheels are carried by the front end section of said frame member and the other two of said gauge wheels are carried by the rear end section of said frame member; wherein each said gauge wheel is rotatably mounted at one end of an arm which is pivotably attached to said frame member; wherein said second control means is further adapted to raise and lower each said gauge wheel.

4. A reversible one-way disk plow in accordance with claim 1, wherein said disk plow means comprises a plurality of plow sections, wherein each said section comprises an elongated central shaft on which a plurality of disk members are carried in spaced relationship with respect to each other; wherein said plow sections are longitudinally aligned; and wherein each said section is carried by said plow carrier.

5. A reversible one-way disk plow in accordance with claim 2, wherein said carriage means comprises first and second movable supports; wherein each said movable support comprises upper rollers which are adapted to be supported on said track member; and wherein each said movable support further comprises lower rollers which are positioned below said track member.

6. A reversible one-way disk plow in accordance with claim 3, wherein said two gauge wheels carried by said rear end section of said frame member are mounted on opposite ends of a single said arm which is pivotably attached to said rear end section.

7. A reversible one-way disk plow in accordance with claim 1, further comprising leveller means adapted to control the attitude of said disk plow with respect to a horizontal plane.

8. A reversible one-way disk plow comprising:

(a) an elongated frame member having front and rear end sections, said frame member including a hitch attached to said front end portion for towing said implement;

(b) transport wheels carried by said frame, said wheels being movable between raised and lowered positions, wherein said wheels are adapted to support said implement for transport when said wheels are in said lowered position;

(c) disk plow means comprising a plurality of disks carried on an elongated shaft;

(d) an elongated plow carrier; wherein said disk plow means is carried by said plow carrier; wherein said plow carrier is pivotable in a horizontal plane with respect to said frame member;

(e) an arcuate track member secured to the underside of said frame member;

(f) carriage means secured to said plow carrier and being carried by said track member; wherein said carriage means is movable along said track member;

(g) four gauge wheels carried by said frame member, said gauge wheels being adapted to control the depth of said disk plow means in the ground when said transport wheels are in said raised position; wherein two of said wheels are carried by the front end section of said frame member and the other two of said gauge wheels are carried by the rear end section of said frame member; wherein each said gauge wheel is rotatably mounted at one end of an arm which is pivotably attached to said frame member;

(h) control means for controlling movement of said transport wheels between said raised and lowered positions and for moving said carriage means along said track member to change the angle of said disk plow means relative to the longitudinal centerline of said frame member.

9. A reversible one-way disk plow in accordance with claim 8, wherein said plow carrier includes a vertical shaft at its mid-point, wherein said vertical shaft is rotatably connected to said frame member.

10. A reversible one-way disk plow in accordance with claim 8, wherein said control means comprises a first and second control means, wherein said first control means comprises a hydraulic cylinder which is adapted to raise and lower said transport wheels; and wherein said second control means comprises a plurality of hydraulic cylinders which are adapted to raise and lower said gauge wheels and move said carriage means along said track member.

11. A reversible one-way disk plow in accordance with claim 8, wherein said disk plow means comprises a plurality of plow sections, wherein each said section comprises an elongated central shaft on which a plurality of disk members are carried in spaced relationship with respect to each other; wherein said plow sections are longitudinally aligned; and wherein each said section is carried by said plow carrier.

12. A reversible one-way disk plow in accordance with claim 9, wherein said carriage means comprises first and second movable supports; wherein each said movable support comprises upper rollers which are adapted to be supported on said track member; and wherein each said movable support further comprises lower rollers which are positioned below said track member 13. A reversible one-way disk plow in accordance with claim 8, wherein said two gauge wheels carried by said rear end section of said frame member are mounted on opposite ends of a single said arm which is pivotably attached to said rear end section.

14. A reversible one-way disk plow in accordance with claim 8, further comprising leveller means adapted to control the attitude of said disk plow with respect to a horizontal plane.

15. A reversible one-way disk plow comprising:
 (a) an elongated frame member having front and rear end sections, said frame member including a hitch attached to said front end portion for towing said implement;
 (b) transport wheels carried by said frame, said wheels being movable between raised and lowered positions, wherein said wheels are adapted to support said implement for transport when said wheels are in said lowered position;
 (c) disk plow means comprising a plurality of plow sections; wherein each said section comprises an elongated central shaft on which a plurality of disk members are carried in spaced relationship with respect to each other; wherein said plow sections are longitudinally aligned;
 (d) an elongated plow carrier; wherein each said plow section is carried by said plow carrier; wherein said plow carrier is pivotable in a horizontal plane with respect to said frame member; wherein said plow carrier includes a vertical shaft at its mid-point which is rotatably connected to said frame member;
 (e) an arcuate track member secured to said frame member;
 (f) carriage means secured to said plow carrier and being carried by said track member; wherein said carriage means is movable along said track member; wherein said carriage means comprises first and second movable supports; wherein each said movable support comprises upper rollers which are adapted to be supported on said track member; and wherein each said movable support further comprises lower rollers which are positioned below said track member.
 (g) a hydraulic cylinder connected between said frame member and said plow carrier; said cylinder being movable between extended and retracted positions; wherein when said cylinder is in said extended position said disk plow means is oriented in a first direction relative to said frame member and when said cylinder is in said retracted position said disk plow means is oriented in a second direction relative to said frame member;
 (h) a plurality of gauge wheels carried by said frame member, said gauge wheels being adapted to control the depth of said disk plow means in the ground when said transport wheels are in said raised position;
 (i) a first control means for controlling movement of said transport wheels between said raised and lowered positions;
 (j) a second control means for raising and lowering said gauge wheels and moving said carriage means along said track member.

16. A reversible one-way disk plow in accordance with claim 15, further comprising a plurality of gauge wheels carried by said frame member, said gauge wheels being adapted to control the depth of said disk plow means in the ground when said transport wheels are in said raised position;

17. A reversible one-way disk plow in accordance with claim 16, wherein there are four of said gauge wheels, wherein two of said gauge wheels are carried by the front end section of said frame member and the other two of said gauge wheels are carried by the rear end section of said frame member; wherein each said gauge wheel is rotatably mounted at one end of an arm which is pivotably attached to said frame member; wherein said control means is further adapted to raise and lower each said gauge wheel.

* * * * *